(12) United States Patent
Ohseki et al.

(10) Patent No.: US 12,010,732 B2
(45) Date of Patent: Jun. 11, 2024

(54) TERMINAL APPARATUS, BASE STATION APPARATUS, CONTROL METHOD, AND COMPUTER-READABLE STORAGE MEDIUM FOR EXECUTING RANDOM ACCESS PROCEDURE

(71) Applicant: KDDI CORPORATION, Tokyo (JP)

(72) Inventors: Takeo Ohseki, Fujimino (JP); Issei Kanno, Fujimino (JP); Yasuhiro Suegara, Fujimino (JP); Masahito Umehara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 379 days.

(21) Appl. No.: 17/396,985

(22) Filed: Aug. 9, 2021

(65) Prior Publication Data
US 2021/0368554 A1    Nov. 25, 2021

Related U.S. Application Data

(63) Continuation of application No. PCT/JP2019/025832, filed on Jun. 28, 2019.

(60) Provisional application No. 62/805,077, filed on Feb. 13, 2019.

(51) Int. Cl.
*H04W 74/0833* (2024.01)
*H04W 76/10* (2018.01)

(52) U.S. Cl.
CPC ....... *H04W 74/0841* (2013.01); *H04W 76/10* (2018.02)

(58) Field of Classification Search
CPC . H04W 74/0833; H04W 72/23; H04W 74/08; H04W 74/004; H04W 74/006; H04W 72/0446
See application file for complete search history.

(56) References Cited

U.S. PATENT DOCUMENTS

2018/0270869 A1    9/2018  Tsai

FOREIGN PATENT DOCUMENTS

| EP | 3 858 069 A1 | 8/2021 |
| EP | 3 937 589 A1 | 1/2022 |
| WO | WO-2018/139575 A1 | 8/2018 |
| WO | WO-2019/064768 A1 | 4/2019 |
| WO | WO-2020020270 A1 * | 1/2020 |

OTHER PUBLICATIONS

EP Office Action on non-Foley case related to U.S. Appl. No. 17/396,985 dated Mar. 31, 2022 (9 pages).
ZTE Corporation, Sanechips, "New work item: 2-step RACH for NR", 3GPP TSG RAN Meeting #82 RP-182894, Dec. 2018, 5 pages.

* cited by examiner

*Primary Examiner* — Khalid W Shaheed
(74) *Attorney, Agent, or Firm* — Foley & Lardner LLP

(57) ABSTRACT

A terminal apparatus, which is able to establish a connection with a base station apparatus via a two-step random access procedure by transmitting a first signal including a random access preamble and predetermined information to the base station apparatus and receiving a second signal as a reply to the first signal from the base station apparatus, acquires a random access-radio network temporary identifier (RA-RNTI) on the basis of a radio resource having been used to transmit the predetermined information with the first signal, and executes reception processing of the second signal using the RA-RNTI.

6 Claims, 8 Drawing Sheets

FIG. 3

| MAC subheader (Random Access Preamble ID #x) | Random Access Response | MAC subheader (Random Access Preamble ID #x) | Random Access Response | ... |

TERMINAL APPARATUS, BASE STATION APPARATUS, CONTROL METHOD, AND COMPUTER-READABLE STORAGE MEDIUM FOR EXECUTING RANDOM ACCESS PROCEDURE

CROSS-REFERENCE TO RELATED APPLICATION(S)

This application is a continuation of International Patent Application No. PCT/JP2019/025832 filed on Jun. 28, 2019, which claims priority to and the benefit of U.S. provisional patent application No. 62/805,077 filed on Feb. 13, 2019, the entire disclosures of which are incorporated herein by reference.

BACKGROUND OF THE INVENTION

Field of the Invention

The present invention relates to a terminal apparatus, a base station apparatus, a control method, and a program and in particular relates to random access procedure enhancing technology.

Description of the Related Art

Wireless communication system standards for Long-Term Evolution (LTE), Fifth Generation (5G) New Radio (NR), and the like are set by the 3rd Generation Partnership Project (3GPP). For LTE and NR, a random access procedure is specified for establishing an initial connection between a terminal apparatus and a base station apparatus or establishing a connection when a handover is performed from another base station apparatus. Conventional random access procedures include four-step processing.

Figure 1:
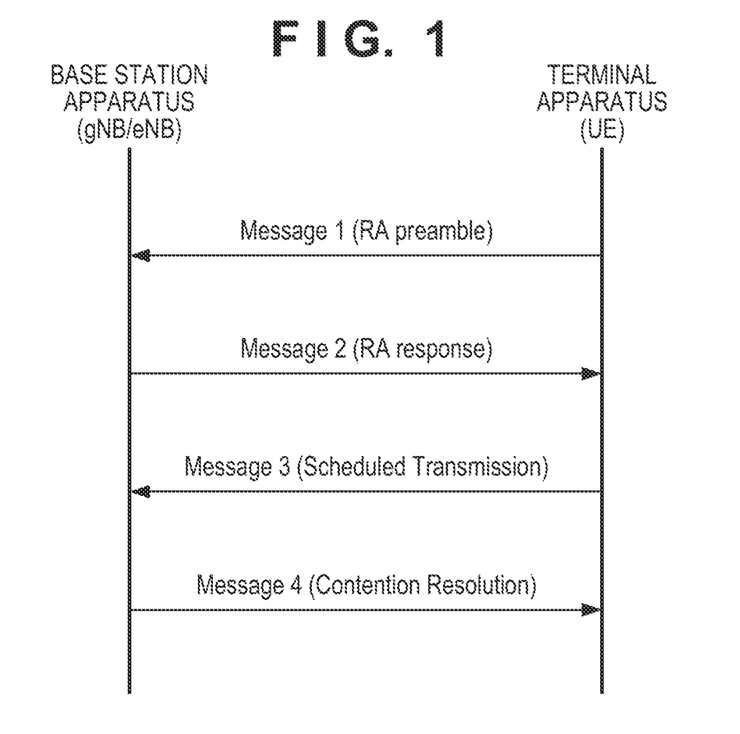
FIG. 1 is a diagram schematically illustrating the flow of four-step RACH.

A processing example of the four-step random access procedure is illustrated in FIG. 1. In the four-step random access procedure, first, a terminal apparatus (user equipment, UE) transmits a random-access (RA) preamble as a first message (message 1) to a base station apparatus. Here, the base station apparatus is indicated by gNB in the case of NR and eNB in the case of LTE, for example. Note that the RA preamble is transmitted using predetermined radio resources (frequency and time resources). When an RA preamble is detected, the base station apparatus transmits an RA response as a second message (message 2) to the terminal apparatus. Message 2 includes information including radio resources used in transmitting a third message (message 3) and parameters for when signals are transmitted to be transmitted after the message 2 is received. Also, the message 2 includes various information including timing advance (TA) for synchronizing the timings of the signals. The terminal apparatus uses the radio resources and pieces of information designated by this information, and, as the message 3, predetermined information for establishing initial access is transmitted from the terminal apparatus to the base station apparatus. Also, replying to the message 3, the base station apparatus transmits a fourth message to the terminal apparatus. Via this procedure, initial connection is established between the terminal apparatus and the base station apparatus.

Figure 2:
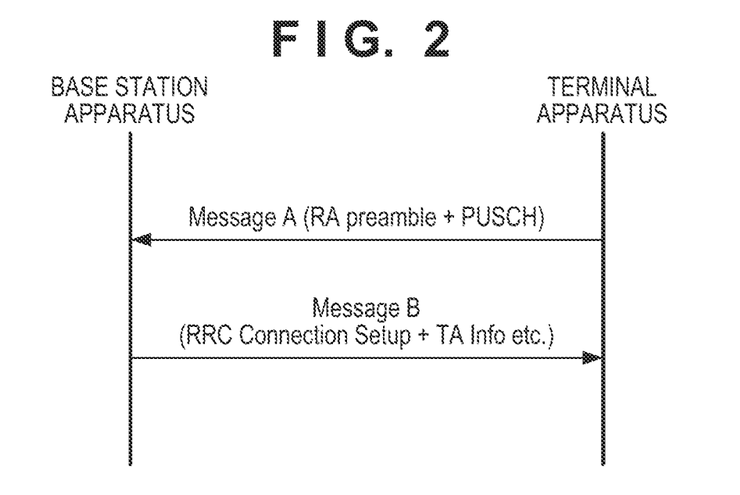
FIG. 2 is a diagram schematically illustrating the flow of two-step RACH.

In the 3GPP, the use of a two-step random access procedure as illustrated in FIG. 2 to reduce the amount of time needed for the initial connection procedure has become a topic of investigation (see NPL 1). In a two-step random access procedure, the terminal apparatus transmits a message A that corresponds to the message 1 and the message 3 described above and includes RA preamble and a physical uplink shared channel (PUSCH) for transmitting predetermined information for initial access. Also, the base station apparatus is configured to reply to the message A by transmitting a message B that corresponds to the message 2 and the message 4 described above. Via the two-step random access procedure, upon completion of the transmission and reception of the message A and the message B, a connection between the terminal apparatus and the base station apparatus is established. Note that hereinafter, the two-step random access procedure may be referred to as "two-step RACH", and the four-step random access procedure may be referred to as "four-step RACH".

The base station apparatus reports the physical downlink shared channel (PDSCH) radio resources that transmit a four-step RACH RA response to the terminal apparatus via a physical downlink control channel (PDCCH). At this time, the PDCCH is scrambled using temporary identification information called a random access-radio network temporary identifier (RA-RNTI). The value of the RA-RNTI is calculated as in Formula (1) according to the radio resources used to transmit the RA preamble.

$$\text{RA-RNTI} = 1 + s\_id + 14 \times t\_id + 14 \times 80 \times f\_id + 14 \times 80 \times 8 \times ul\_carrier\_id \quad \text{Formula (1)}$$

Here, s_id is a value corresponding to the first OFDM symbol of the RA preamble, and t_id is a value corresponding to the first time slot of the RA preamble. Also, f_id is a value corresponding to an index of the resource block corresponding to the lowest frequency of the RA preamble, and ul_carrier_id is a value corresponding to 0 in the case of a normal uplink (NUL) and 1 in the case of a supplementary uplink (SUL). The base station apparatus acquires the RA-RNTI in accordance with Formula (1) and scrambles the PDCCH that designates the PDSCH radio resources for transmitting the RA response. The terminal apparatus also acquires the RA-RNTI in accordance with Formula (1). Then, the terminal apparatus uses the acquired RA-RNTI to execute descrambling of the PDCCH and receive the RA response with the radio resources designated by the PDCCH.

Figure 3:
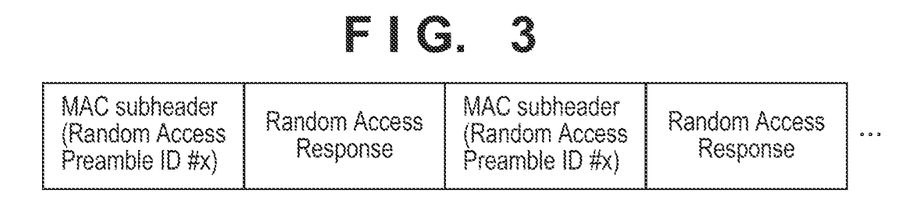
FIG. 3 is a diagram illustrating a configuration example of a MAC frame for transmitting a random access response in a case where there is only a terminal apparatus executing four-step RACH.

Because the RA-RNTI value is determined by the radio resources when the RA preamble is transmitted, when different terminal apparatuses transmit an RA preamble with the same radio resources, the terminal apparatuses use the same RA-RNTI and wait for an RA response. Note that the RA preamble from a plurality of terminal apparatuses can be partitioned at the base station apparatus by them being transmitted via different sequences. The base station apparatus can transmit an RA response to the plurality of terminal apparatuses using a single RA-RNTI via packets of medium access control (MAC) frames such as that illustrated in FIG. 3. In the example of FIG. 3, next to the MAC subheader including identification information (Random Access Preamble ID) of the sequence of the RA preamble used by a terminal apparatus, an RA response addressed to this terminal apparatus corresponding to the identification information is located. Also, next to the RA response, the MAC subheader including identification information (Random Access Preamble ID) of the sequence of the RA preamble used by another terminal apparatus and an RA response addressed to this terminal apparatus corresponding to the identification information are located. Because the terminal apparatus knows beforehand the size of the MAC subheader and the RA response, the terminal apparatus can identify the starting location of the MAC subheader and the RA response in the received MAC frame. Then, the terminal apparatus can search for the MAC subheader including identification number of the sequence used by the terminal apparatus to transmit the RA preamble and execute reception processing of the RA response in accordance with the identification number.

CITATION LIST

Non Patent Literature

NPL1: 3GPP, RP-182894

In two-step RACH, as the reply to the message A transmitted by the terminal apparatus, the message B including information corresponding to the RA response and other information is transmitted from the base station apparatus. At this time, in a case where a terminal apparatus executing two-step RACH and a terminal apparatus executing four-step RACH use the same radio resources to transmit an RA preamble (the RA preamble portion of the message A in two-step RACH), it can be expected that the RA-RNTI of these terminal apparatuses are the same. At this time, the size of the message B for the terminal apparatus executing two-step RACH is different from the size of the message 2 for the terminal apparatus executing four-step RACH. Thus, as illustrated in FIG. 3, in a case where the information for these terminal apparatuses is linked and transmitted via a MAC frame, the terminal apparatus executing the four-step RACH at least is unable to identify the starting location of the MAC subheader and the RA response in the received MAC frame.

SUMMARY OF THE INVENTION

The present invention provides technology for enhancing a random access procedure in an environment where there is both a terminal apparatus executing two-step RACH and a terminal apparatus executing four-step RACH.

A terminal apparatus according to an aspect of the present invention, is a terminal apparatus able to establish a connection with a base station apparatus via a two-step random access procedure by transmitting a first signal including a random access preamble and predetermined information to the base station apparatus and receiving a second signal as a reply to the first signal from the base station apparatus, wherein the terminal apparatus acquires a random access-radio network temporary identifier (RA-RNTI) on the basis of a radio resource having been used to transmit the predetermined information with the first signal; and the terminal apparatus executes reception processing of the second signal using the RA-RNTI.

A terminal apparatus according to another aspect of the present invention is a terminal apparatus able to establish a connection with a base station apparatus via a two-step random access procedure by transmitting a first signal including a random access preamble and predetermined information to the base station apparatus and receiving a second signal as a reply to the first signal from the base station apparatus, wherein the terminal apparatus acquires a random access-radio network temporary identifier (RA-RNTI) by adding a predetermined offset value to a value acquired on the basis of a radio resource having been used to transmit the random access preamble with the first signal; and the terminal apparatus executes reception processing of the second signal using the RA-RNTI.

A base station apparatus according to an aspect of the present invention is a base station apparatus able to establish a connection with a terminal apparatus via a two-step random access procedure by receiving a first signal including a random access preamble and predetermined information from the terminal apparatus and transmitting a second signal as a reply to the first signal to the terminal apparatus, wherein the base station apparatus acquires a random access-radio network temporary identifier (RA-RNTI) on the basis of a radio resource having been used to transmit the predetermined information with the first signal; and the base station apparatus executes transmission processing of the second signal using the RA-RNTI.

A base station apparatus according to another aspect of the present invention is a base station apparatus able to establish a connection with a terminal apparatus via a two-step random access procedure by receiving a first signal including a random access preamble and predetermined information from the terminal apparatus and transmitting a second signal as a reply to the first signal to the terminal apparatus, wherein the base station apparatus acquires a random access-radio network temporary identifier (RA-RNTI) by adding a predetermined offset value to a value acquired on the basis of a radio resource having been used to transmit the random access preamble with the first signal; and the base station apparatus executes transmission processing of the second signal using the RA-RNTI.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

Figure 4:
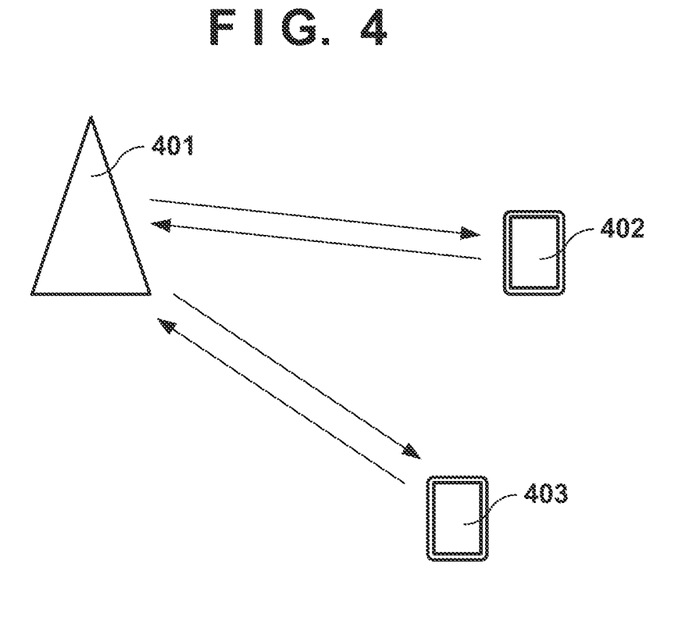
FIG. 4 is a diagram illustrating an example configuration of a wireless communication system.

FIG. 4 is a diagram illustrating an example configuration of a wireless communication system according to the present embodiment. The system of the present embodiment is an example of a 5G cellular communication system. However, no such limitation is intended, and the system of the present embodiment may be a cellular communication system of a 5G successor or a non-cellular wireless communication system. The system of the present embodiment includes a base station apparatus 401, a terminal apparatus 402, and a terminal apparatus 403. Note that in FIG. 4, to facilitate understanding, only one base station apparatus and two terminal apparatuses are illustrated. However, the number of the apparatuses is not limited thereto, and more base station apparatuses and terminal apparatuses may be present or only one terminal apparatus may be present.

Figure 5A:
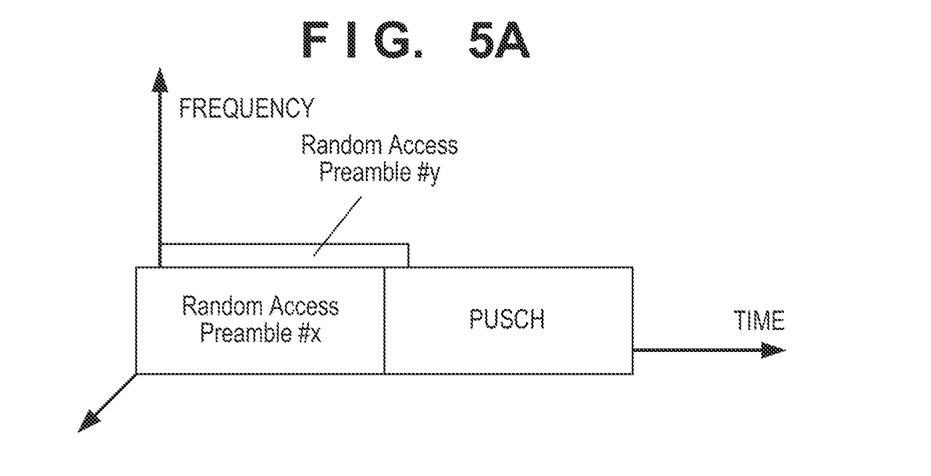
FIG. 5A is a diagram schematically illustrating a state in which a terminal apparatus executing two-step RACH and a terminal apparatus executing four-step RACH transmit a random access preamble using the same radio resources.

Here, for example, the terminal apparatus 402 executes the two-step RACH illustrated in FIG. 2, the terminal apparatus 403 executes the four-step RACH illustrated in FIG. 1, and both attempt to establish a connection with the base station apparatus 401. At this time, the terminal apparatus 402 and the terminal apparatus 403 transmit an RA preamble with the same radio resources (time and frequency resources). In other words, the RA preamble portion of the message A of the two-step RACH transmitted by the terminal apparatus 402 and the RA preamble of the four-step RACH transmitted by the terminal apparatus 403 use the same time and frequency resources. This state is illustrated in FIG. 5A. Note that the terminal apparatus 402 and the terminal apparatus 403 each select at random a sequence to use to transmit the RA preamble from a plurality of candidates (reported from the base station apparatus 401, for example) and transmit the RA preamble using the selected sequence. Even in a case where a plurality of terminal apparatuses transmit an RA preamble with the same radio resources, the base station apparatus can partition the RA preambles because of the different sequences used. Note that because the terminal apparatus 402 transmits the message A of the two-step RACH, after the RA preamble, the terminal apparatus 402 transmits a physical uplink shared channel (PUSCH) for transmitting predetermined information for connecting to the base station apparatus.

Figure 5B:
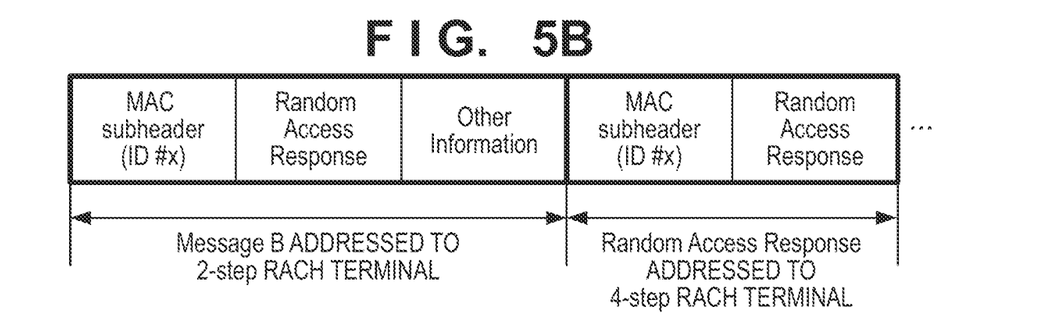
FIG. 5B is a diagram illustrating a MAC frame including a random access response to a terminal apparatus executing two-step RACH and a terminal apparatus executing four-step RACH.

Typically, a base station apparatus calculates the RA-RNTI as in Formula (1) on the basis of the radio resources used to transmit the RA preamble received from the terminal apparatus. With this configuration, as in the state illustrated in FIG. 5A, the radio resources used to transmit the RA preamble transmitted from the terminal apparatus 402 and the terminal apparatus 403 are shared. Thus, the RA-RNTI for each of the terminal apparatuses is the same value. In this case, a reply (the message B and an RA response) to the RA preamble from the base station apparatus to the terminal apparatus 402 and the terminal apparatus 403 is transmitted via a shared MAC frame. This is illustrated in FIG. 5B. In the example of FIG. 5B, the message B for the terminal apparatus 402 is transmitted first, and thereafter the RA response for the terminal apparatus 403 is transmitted. In this case, the terminal apparatus 402 can receive all of the message B addressed to it. However, a terminal apparatus only able to execute four-step RACH (for example, the terminal apparatus 403) does not know the size of the message B of the two-step RACH, and thus, for the RA response addressed to it, at which portion of the frame the RA response starts, cannot be recognized. As a result, this terminal apparatus cannot receive the RA response.

In the present embodiment, in light of the foregoing, a calculation rule of the RA-RNTI for the two-step RACH and a calculation rule of the RA-RNTI for the four-step RACH are different. Accordingly, because the RA-RNTI for the terminal apparatus executing two-step RACH and the RA-RNTI for the terminal apparatus executing four-step RACH are different, separate radio resources for PDSCH can be designated via different PDCCHs. As a result, both the message B of two-step RACH and the RA response of four-step RACH being included and transmitted in one MAC frame can be prevented. In other words, the MAC frame for transmitting the message B of two-step RACH and the MAC frame for transmitting the RA response of four-step RACH are different. In this manner, the terminal apparatus only able to execute four-step RACH can be prevented from being unable to receive the RA response due to the effects of another terminal apparatus executing two-step RACH.

Hereinafter, the configuration of an apparatus that executes such processing and some examples of the processing flow will be described.

Apparatus Configuration

Figure 6:
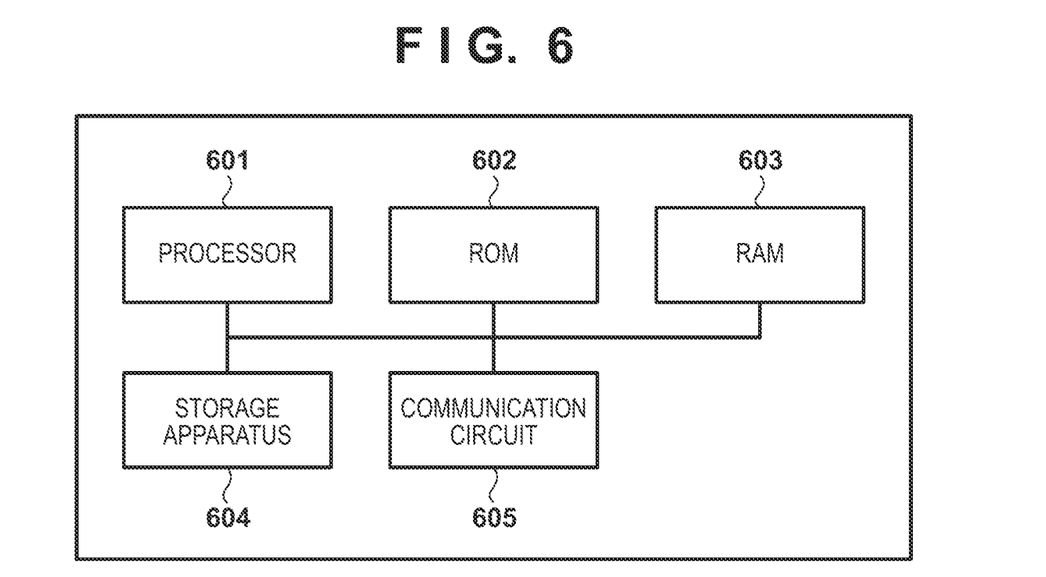
FIG. 6 is a diagram illustrating an example of the hardware configuration of a terminal apparatus and a base station apparatus.

FIG. 6 is a diagram illustrating an example of the hardware configuration of the terminal apparatus and the base station apparatus of the present embodiment. The terminal apparatus and the base station apparatus, for example, include a processor 601, ROM 602, RAM 603, a storage apparatus 604, and a communication circuit 605. In the terminal apparatus, for example, a program for implementing the functions of the terminal apparatus described above, for example, stored in the ROM 602, the RAM 603, or the storage apparatus 604 is executed by the processor 601. In a similar manner, in the base station apparatus, a program for implementing the functions of the base station apparatus described above, for example, stored in the ROM 602, the RAM 603, or the storage apparatus 604 is executed by the processor 601. Note that the processor 601 may be one or more processors including a central processing unit (CPU), an application specific integrated circuit (ASIC), a field-programmable gate array (FPGA), a digital signal processor (DSP), and the like.

The terminal apparatus and the base station apparatus control the communication circuit 605 via the processor 601, for example, and communicate with the partner apparatus (for example, in the case of the terminal apparatus, the base station apparatus, and in the case of the base station apparatus, the terminal apparatus or a network node). Note that in FIG. 6, the terminal apparatus and the base station apparatus are schematically illustrated including a single communication circuit 605. However, no such limitation is intended. For example, the terminal apparatus may include a communication circuit for communication with the base station apparatus and a communication circuit for communication with a wireless LAN or the like. Also, for example, the base station apparatus may include a communication circuit for communication with the terminal apparatus and a communication circuit for communication with a network node.

Note that the terminal apparatus and the base station apparatus may be provided with dedicated hardware for executing the functions. Alternatively, a portion of the functions may be executed by the hardware and the other portion may be executed by a computer running a program. Also, all functions may be executed by a computer and a program.

Figure 7:
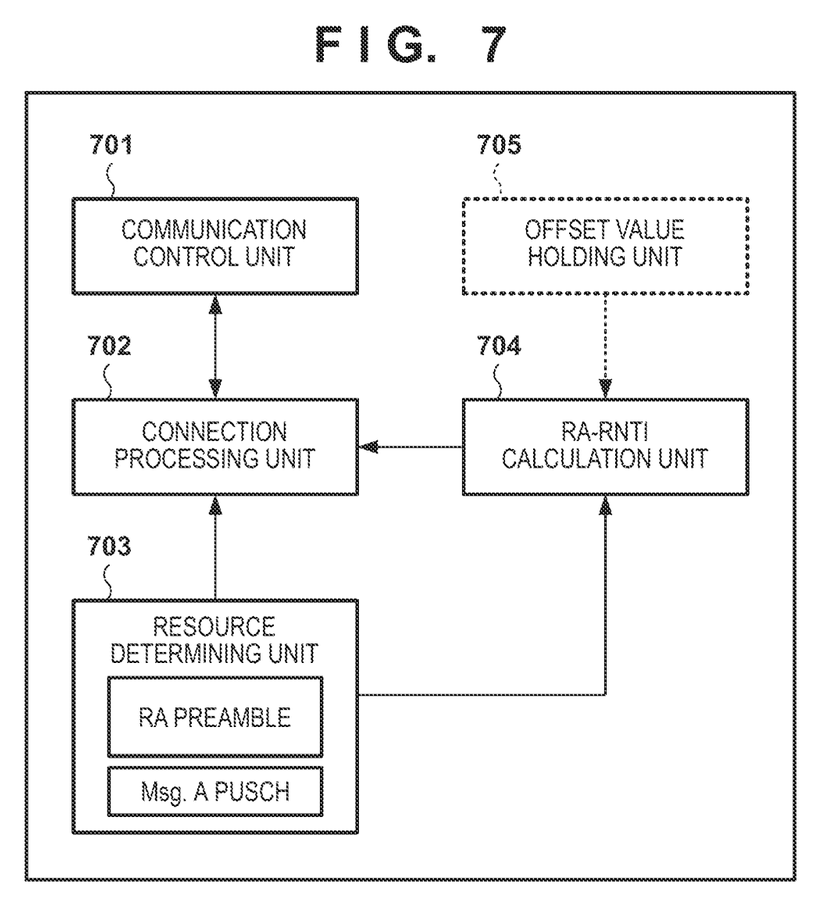
FIG. 7 is a diagram illustrating an example of the functional configuration of the terminal apparatus.
Figure 8:
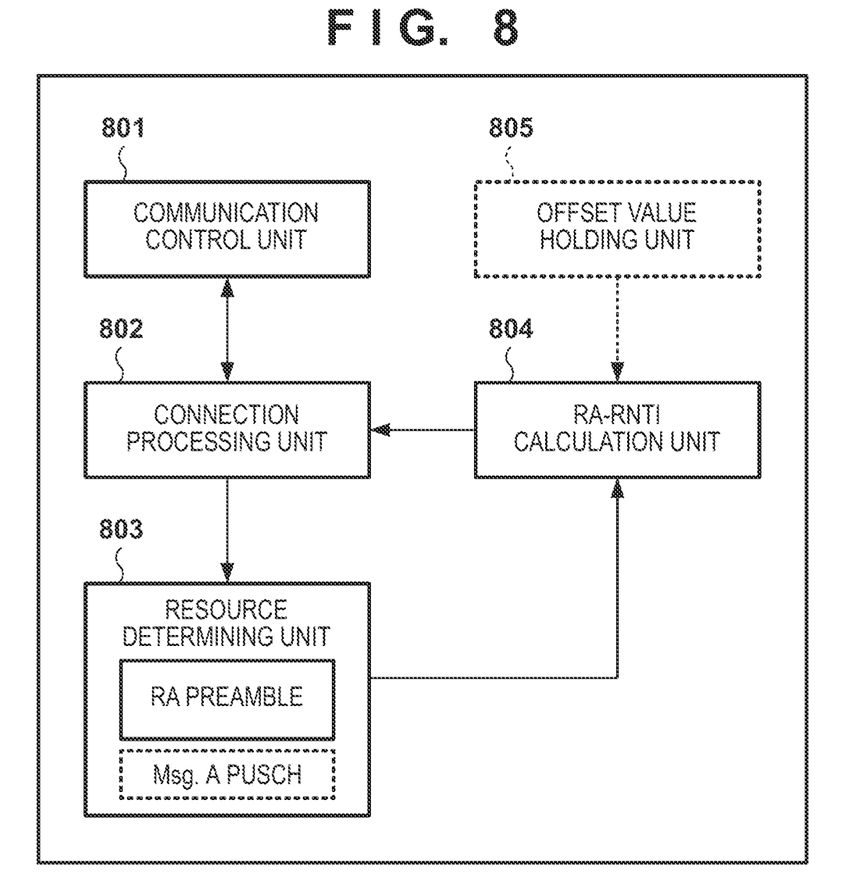
FIG. 8 is a diagram illustrating an example of the functional configuration of a base station apparatus.

FIG. 7 is a diagram illustrating an example of the functional configuration of the terminal apparatus. The terminal apparatus includes, as functions, a communication control unit 701, a connection processing unit 702, a resource determining unit 703, and an RA-RNTI calculation unit 704, for example. The terminal apparatus may optionally include an offset value holding unit 705. FIG. 8 is a diagram illustrating an example of the functional configuration of the base station apparatus. The base station apparatus includes, as functions, a communication control unit 801, a connection processing unit 802, a resource determining unit 803, and an RA-RNTI calculation unit 804, for example. Note that the base station apparatus may optionally include an offset value holding unit 805.

The communication control unit 701 of the terminal apparatus controls the communication (wireless communication compliant with 5G communication standards, for example) performed with the base station apparatus. The communication control unit 701, for example, executes various types of control to execute communication with the base station apparatus. The communication control unit 801 of the base station apparatus controls the communication (wireless communication compliant with 5G communication standards, for example) performed with the terminal apparatus within the cell formed by the base station apparatus. The communication control unit 801, for example, executes various types of control to execute communication with the terminal apparatus. The connection processing unit 702 of the terminal apparatus executes two-step RACH or four-step RACH via the communication control unit 701 to establish connection with the base station apparatus. Note that the terminal apparatus may only be able to execute two-step RACH or four-step RACH, or may be able to execute both. For example, a terminal apparatus compliant with the standards of Release 15 may be configured to be able to execute only four-step RACH. Also, the connection processing unit 802 of the base station apparatus executes two-step RACH or four-step RACH via the communication control unit 801 to establish connection with the base station apparatus. The terminal apparatus and the base station apparatus are configured to be able to establish a connection by two-step RACH or four-step RACH processing being successful. Note that the flow of two-step RACH and four-step RACH is as described above, and thus will be omitted from this description.

In a case where a four-step RACH is executed, the resource determining unit 703 of the terminal apparatus determines the radio resources (time and frequency resources) to use to transmit the RA preamble. Also, in a case where a two-step RACH is executed, the resource determining unit 703 determines the radio resources to use to transmit the RA preamble portion in the message A. Furthermore, in a case where two-step RACH is executed, the resource determining unit 703 may determine the radio resources to use to transmit the PUSCH portion in the message A. Note that in a case where the PUSCH portion in the message A is uniquely set according to the radio resources of the RA preamble portion, for example, radio resource determination processing for the PUSCH portion may not be executed. The connection processing unit 702 uses the radio resources determined by the resource determining unit 703 to transmit the message A of the two-step RACH or the RA preamble of the four-step RACH.

The resource determining unit 803 of the base station apparatus identifies the radio resources used to transmit the RA preamble of the four-step RACH or the radio resources used to transmit the RA preamble portion in the message A of the two-step RACH received from the terminal apparatus. Also, the resource determining unit 803 may identify the radio resources used to transmit the PUSCH portion in the message A of the two-step RACH. The resource determining unit 803, for example, identifies each of the radio resources described above by monitoring by which radio resource the connection processing unit 802 received a message from the terminal apparatus.

The RA-RNTI calculation unit 704 of the terminal apparatus and the RA-RNTI calculation unit 804 of the base station apparatus calculate the RA-RNTI for the terminal apparatus on the basis of the radio resources used to transmit the RA preamble of the four-step RACH or the radio resources used to transmit the RA preamble portion and/or the PUSCH portion of the message A of the two-step RACH. Also, the RA-RNTI calculation unit 704 and the RA-RNTI calculation unit 804, for example, may calculate the RA-RNTI for the terminal apparatus on the basis of an offset value held in the offset value holding unit 705 and the offset value holding unit 805. The offset value holding unit 705 and the offset value holding unit 805 hold an offset value shared by the terminal apparatus and the base station apparatus and output the offset value as necessary to both the RA-RNTI calculation unit 704 and the RA-RNTI calculation unit 804. The RA-RNTI calculation unit 704 and the RA-RNTI calculation unit 804 calculate the RA-RNTI in accordance with the shared RA-RNTI calculation rule. Note that with the RA-RNTI calculation unit 704 and the RA-RNTI calculation unit 804, in any case, the calculation rule of the RA-RNTI for the terminal apparatus executing two-step RACH and the calculation rule of the RA-RNTI for the terminal apparatus executing four-step RACH are different. This processing will be described below.

The connection processing unit 802 of the base station apparatus executes transmission processing to transmit, to the terminal apparatus executing four-step RACH, the PDCCH designating the radio resources to be transmitted by the RA response, the PDCCH being scrambled using the calculated RA-RNTI, and the PDSCH for transmitting the RA response. Also, the connection processing unit 802 executes transmission processing to transmit, to the terminal apparatus executing two-step RACH, the PDCCH designating the radio resources to be transmitted by the message B, the PDCCH being scrambled using the calculated RA-RNTI, and the PDSCH for transmitting the message B. Furthermore, the connection processing unit 702 of the terminal apparatus executes reception processing to use the calculated RA-RNTI to wait for the PDCCH from the base station apparatus and receive the RA response or the message B via the radio resources designated by the PDCCH.

RA-RNTI Calculation Processing

Next, RA-RNTI calculation processing executed by the RA-RNTI calculation unit 704 and the RA-RNTI calculation unit 804 will be described. Note that hereinafter, a case where the RA-RNTI is calculated is described. However, for example, a lookup table in which the radio resources to be used and the RA-RNTI values identified in advance via the calculation rules described below are associated may be prepared for both two-step RACH and four-step RACH. In this case, the RA-RNTI calculation unit 704 and the RA-RNTI calculation unit 804 can acquire the RA-RNTI value without calculating it each time by referencing the lookup table on the basis of whether two-step RACH or four-step RACH is being used and the radio resources used.

Processing Example 1

Figure 9:
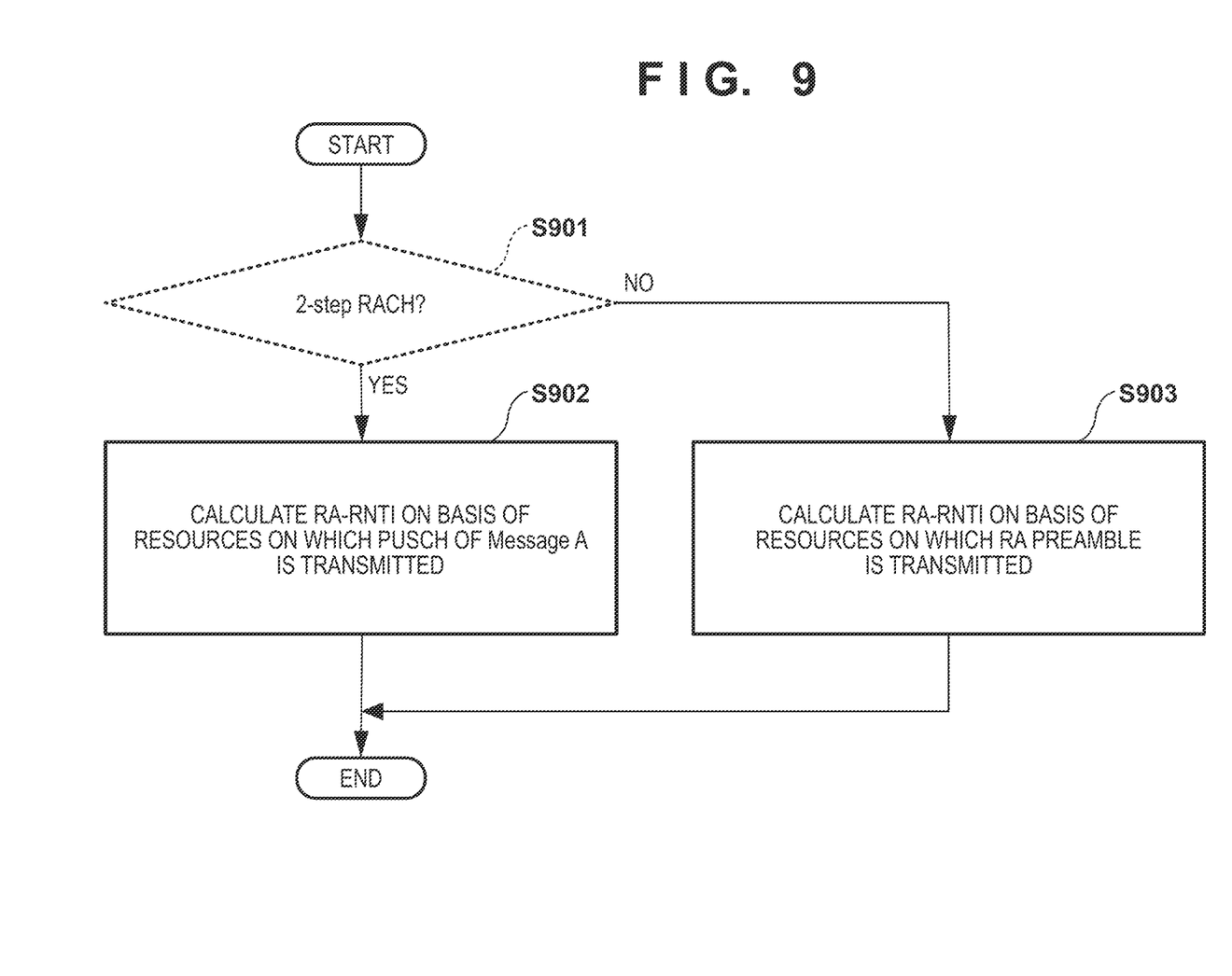
FIG. 9 is a diagram illustrating the flow of the processing to calculate RA-RNTI.

FIG. 9 is a diagram illustrating a first example of RA-RNTI calculation processing. In this example, as in a typical example, the RA-RNTI is calculated for the terminal apparatus executing four-step RACH on the basis of the radio resources used to transmit the RA preamble, and the RA-RNTI is calculated for the terminal apparatus executing two-step RACH on the basis of the radio resources used to transmit the PUSCH of the message A.

The RA-RNTI calculation unit 704 of the terminal apparatus first determines whether the terminal apparatus is executing two step RACH or executing four-step RACH (step S901). Also, the RA-RNTI calculation unit 804 of the base station apparatus determines whether the terminal apparatus is executing two step RACH or executing four-step RACH by determining whether the message received from the terminal apparatus is the RA preamble of the four-step RACH or the message A of the two-step RACH (step S901). Then, in a case where the terminal apparatus is determined to be executing two-step RACH (YES in step S901), the RA-RNTI calculation unit 704 and the RA-RNTI calculation unit 804 calculate the RA-RNTI on the basis of the radio resources of the PUSCH portion in the message A transmitted by the terminal apparatus (step S902). Note that this calculation is executed according to Formula (1) described above with s_id corresponding to a value corresponding to the first OFDM symbol of the PUSCH of the message A, t_id corresponding to a value corresponding to the first time slot of the PUSCH of the message A, and f_id corresponding to a value corresponding to an index of a resource block corresponding to the lowest frequency of the PUSCH of the message A. On the other hand, in a case where the terminal apparatus is determined to be executing four-step RACH (NO in step S901), the RA-RNTI calculation unit 704 and the RA-RNTI calculation unit 804 calculate the RA-RNTI on the basis of the radio resources of the RA preamble transmitted by the terminal apparatus (step S903). The RA-RNTI in this case is calculate in accordance with Formula (1). Note that in a case where the RA-RNTI calculation unit 804 of the base station apparatus receives messages from a plurality of terminal apparatuses, the processing of FIG. 9 is executed and the RA-RNTI is calculated for each of the plurality of terminal apparatuses.

Note that in a case where the terminal apparatus can only execute four-step RACH or two-step RACH, the RA-RNTI calculation unit 704 of the terminal apparatus may omit the determination of step S901, with only step S902 being executed for a terminal apparatus only able to execute two-step RACH and only step S903 being executed for a terminal apparatus only able to execute four-step RACH.

In a case where the RA preamble portion of the message A in two-step RACH and the RA preamble of the four-step RACH are transmitted with the same radio resources, the radio resources of the PUSCH portion of the message A is transmitted with different radio resources. Thus, with the method described above, a first RA-RNTI for a terminal apparatus, from among the terminal apparatuses that transmitted an RA preamble with the same radio resources, executing two-step RACH and a second RA-RNTI for a terminal apparatus, from among the terminal apparatuses that transmitted an RA preamble with the same radio resources, executing four-step RACH can be made different.

Processing Example 2

Figure 10:
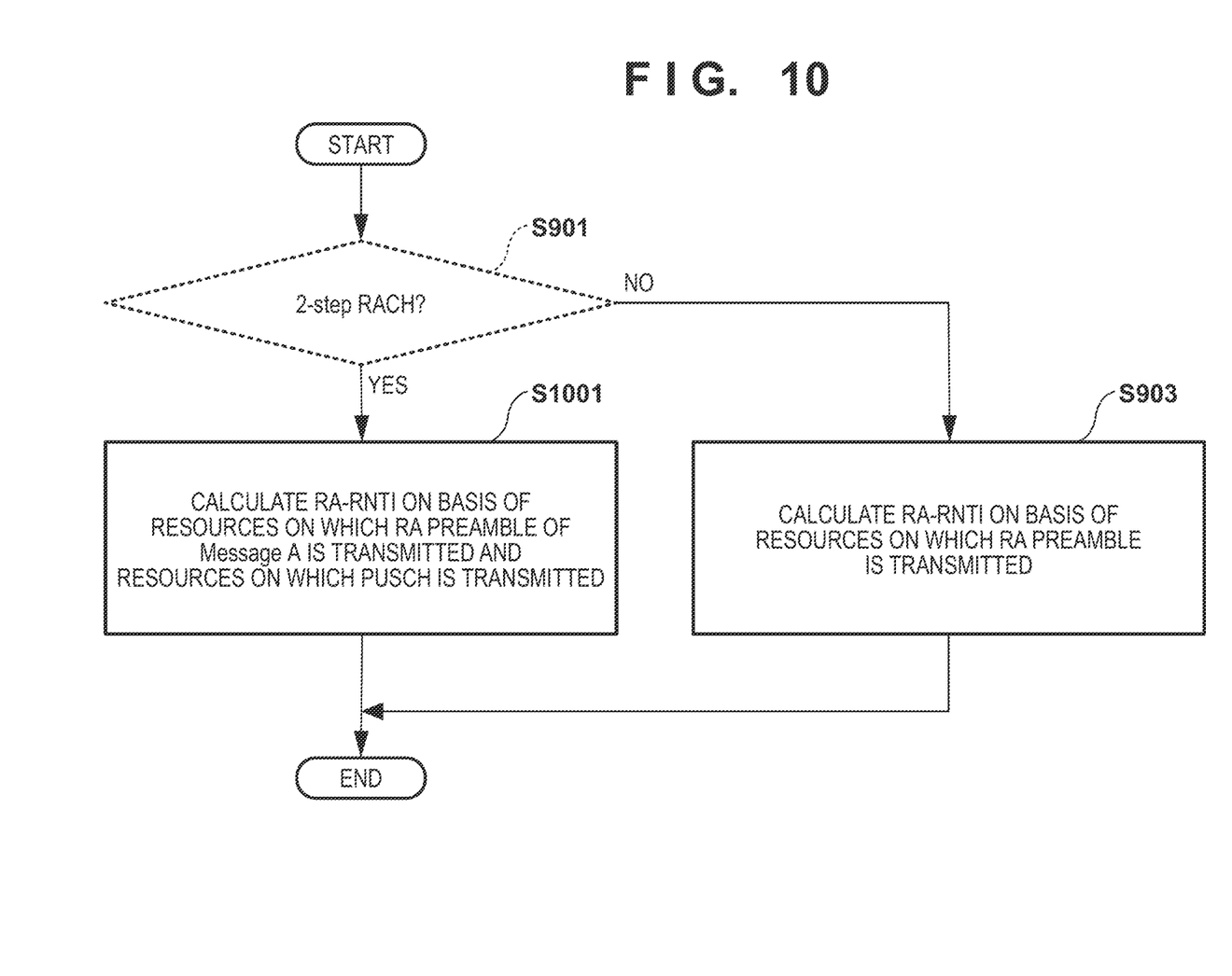
FIG. 10 is a diagram illustrating an example of the flow of processing to calculate RA-RNTI.

FIG. 10 is a diagram illustrating a second example of RA-RNTI calculation processing. In this example also, as in a typical example, the RA-RNTI is calculated for the terminal apparatus executing four-step RACH on the basis of the radio resources used to transmit the RA preamble. However, in this example, the RA-RNTI is calculated for the terminal apparatus executing two-step RACH on the basis of both the radio resources used to transmit the RA preamble of the message A and the radio resources used to transmit the PUSCH. Note that in the processing of FIG. 10, step S901 and step S903 are the same as in the processing of FIG. 9 and are thus omitted from this description.

In the processing of FIG. 10, in a case where the terminal apparatus is determined to be executing two-step RACH (YES in step S901), the RA-RNTI calculation unit 704 and the RA-RNTI calculation unit 804 calculate the RA-RNTI on the basis of the radio resources of both the RA preamble portion in the message A transmitted by the terminal apparatus and the PUSCH portion (step S1001). The RA-RNTI in this case is calculated as in Formula (2), for example.

$$\text{RA-RNTI} = 1 + s\_id_{preamble} + 14 \times t\_id_{preamble} + 14 \times 80 \times f\_id_{preamble} + 14 \times 80 \times 8 \times ul\_carrier\_id + 1 \times s\_id_{pusch} + 14 \times t\_id_{pusch} + 14 \times 80 \times f\_id_{pusch} + 14 \times 80 \times 8 \times ul\_carrier\_id \quad \text{Formula (2)}$$

Here, $s\_id_{preamble}$ is a value corresponding to the first OFDM symbol of the RA preamble of the message A, and $t\_id_{preamble}$ is a value corresponding to the first time slot of the RA preamble of the message A. Also, $f\_id_{preamble}$ is a value corresponding to the index of a resource block corresponding to the lowest frequency of the RA preamble of the message A. Also, $s\_id_{pusch}$ is a value corresponding to the first OFDM symbol of the PUSCH of the message A, and $t\_id_{pusch}$ is a value corresponding to the first time slot of the PUSCH of the message A. Also, $f\_id_{pusch}$ is a value corresponding to the index of a resource block corresponding to the lowest frequency of the PUSCH of the message A.

In a case where the RA preamble portion of the message A in two-step RACH and the RA preamble of the four-step RACH are transmitted with the same radio resources, the values calculated as in Formula (1) for these portions are the same. However, in the present embodiment, because the radio resources of the PUSCH portion of the message A are added to the value calculated as in Formula (1) for the terminal apparatus executing two-step RACH, the finally obtained RA-RNTI is different from the RA-RNTI calculated for the terminal apparatus executing four-step RACH. Thus, with the method described above, a first RA-RNTI for a terminal apparatus, from among the terminal apparatuses that transmitted an RA preamble with the same radio resources, executing two-step RACH and a second RA-RNTI for a terminal apparatus, from among the terminal apparatuses that transmitted an RA preamble with the same radio resources, executing four-step RACH can be made different.

Processing Example 3

Figure 11:
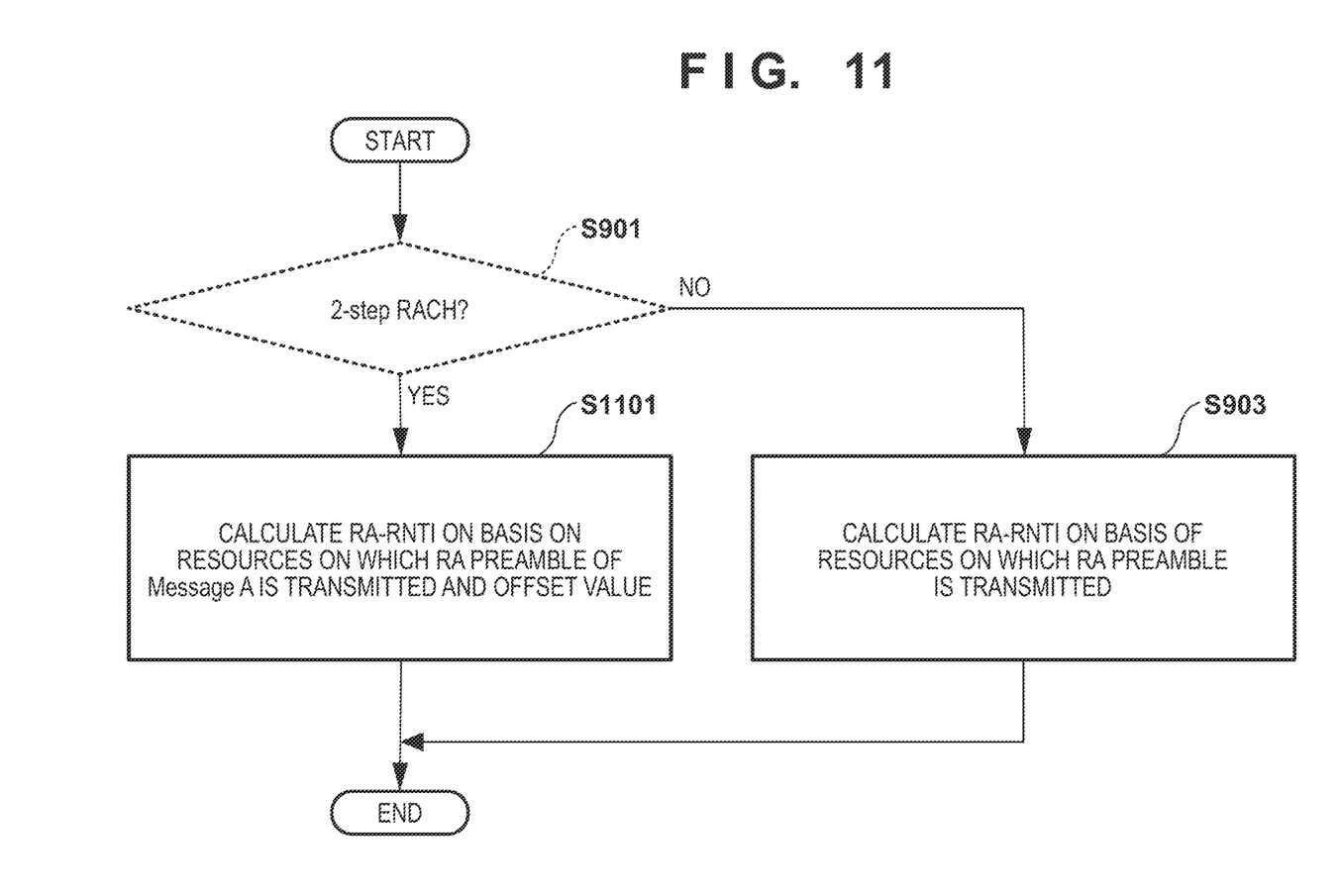
FIG. 11 is a diagram illustrating an example of the flow of the processing to calculate RA-RNTI.

FIG. 11 is a diagram illustrating a third example of RA-RNTI calculation processing. In this example also, as in a typical example, the RA-RNTI is calculated for the terminal apparatus executing four-step RACH on the basis of the radio resources used to transmit the RA preamble. However, in this example, for the terminal apparatus executing two-step RACH, the final RA-RNTI is acquired by adding a predetermined offset value to the value calculated on the basis of the radio resources used to transmit the RA preamble of the message A. In this processing example, the RA-RNTI for the terminal apparatus executing two-step RACH and the RA-RNTI for the terminal apparatus executing four-step RACH can be separated by the predetermined offset value. Note that in the processing of FIG. 11, step S901 and step S903 are the same as in the processing of FIG. 9 and are thus omitted from this description.

In the processing of FIG. 11, in a case where the terminal apparatus is determined to be executing two-step RACH (YES in step S901), the RA-RNTI calculation unit 704 and the RA-RNTI calculation unit 804 calculate the RA-RNTI on the basis of the radio resources of the RA preamble portion in the message A transmitted by the terminal apparatus and the predetermined offset value (step S1101). The RA-RNTI in this example is calculated as in Formula (3), for example.

$$\text{RA-RNTI}=1+s\_id+14 \times t\_id+14 \times 80 \times f\_id+14 \times 80 \times 8 \times ul\_carrier\_id+14 \times 80 \times 8 \times 2 \quad \text{Formula (3)}$$

Note that the predetermined offset value here is $14 \times 80 \times 8 \times 2$.

According to this processing example, in a case where the RA preamble portion of the message A in two-step RACH and the RA preamble of the four-step RACH are transmitted with the same radio resources, the RA-RNTI values are offset by the amount of the offset value. Thus, with the method described above, a first RA-RNTI for a terminal apparatus, from among the terminal apparatuses that transmitted an RA preamble with the same radio resources, executing two-step RACH and a second RA-RNTI for a terminal apparatus, from among the terminal apparatuses that transmitted an RA preamble with the same radio resources, executing four-step RACH can be made different.

According to the present embodiment as described above, because the RA-RNTI for the terminal apparatus executing two-step RACH and the RA-RNTI for the terminal apparatus executing four-step RACH are different, separate radio resources for PDSCH are designated via different PDCCHs. The MAC frame (packet) for transmitting the message B of two-step RACH and the MAC frame (packet) for transmitting the RA response of four-step RACH can be made different. In this manner, the terminal apparatus only able to execute four-step RACH can be prevented from being unable to receive the RA response due to the effects of another terminal apparatus executing two-step RACH.

Note that the mathematical formulas described above are merely examples, and the RA-RNTI may be acquired in accordance with different mathematical formulas. Also, the processing examples described above are examples, and the RA-RNTIs may be calculated by different types of method that can make different the RA-RNTI for the terminal apparatus executing two-step RACH and the RA-RNTI for the terminal apparatus executing four-step RACH.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus able to establish a connection with a base station apparatus via a two-step random access procedure by transmitting a first signal including a random access preamble and predetermined information to the base station apparatus and receiving a second signal as a reply to the first signal from the base station apparatus, wherein
the terminal apparatus acquires a random access-radio network temporary identifier (RA-RNTI) by adding a predetermined offset value to a value acquired on the basis of a radio resource having been used to transmit the random access preamble with the first signal, and
the terminal apparatus executes reception processing of the second signal using the RA-RNTI,
wherein the terminal apparatus is further able to establish a connection with the base station apparatus via a four-step random access procedure, and
in a case where the four-step random access procedure is used, the terminal apparatus acquires a second RA-RNTI on the basis of a radio resource having been used to transmit a random access preamble from the terminal apparatus to the base station apparatus via the four-step random access procedure and executes reception processing of a random access response, which is a reply to the random access preamble, using the second RA-RNTI.

2. A base station apparatus able to establish a connection with a terminal apparatus via a two-step random access procedure by receiving a first signal including a random access preamble and predetermined information from the terminal apparatus and transmitting a second signal as a reply to the first signal to the terminal apparatus, wherein
the base station apparatus acquires a random access-radio network temporary identifier (RA-RNTI) by adding a predetermined offset value to a value acquired on the basis of a radio resource having been used to transmit the random access preamble with the first signal; and
the base station apparatus executes transmission processing of the second signal using the RA-RNTI,
wherein the base station apparatus is further able to establish a connection with the terminal apparatus via a four-step random access procedure, and
in a case where the four-step random access procedure is used, the base station apparatus acquires a second RA-RNTI on the basis of a radio resource having been used to transmit a random access preamble from the terminal apparatus to the base station apparatus via the four-step random access procedure and executes transmission processing of a random access response, which is a reply to the random access preamble, using the second RA-RNTI.

3. A control method executed by a terminal apparatus, comprising: establishing a connection with a base station apparatus via a two-step random access procedure by transmitting a first signal including a random access preamble and predetermined information to the base station apparatus and receiving a second signal as a reply to the first signal from the base station apparatus or via a four step random access procedure; and
when establishing the connection via the two-step random access procedure,
acquiring a random access-radio network temporary identifier (RA-RNTI) by adding a predetermined offset value to a value acquired on the basis of a radio resource having been used to transmit the random access preamble with the first signal, and executing reception processing of the second signal using the RA-RNTI, and when establishing the connection via the four-step random access procedure,
acquiring a second RA-RNTI on the basis of a radio resource having been used to transmit a random access preamble from the terminal apparatus to the base station apparatus via the four-step random access procedure, and
executing reception processing of a random access response, which is a reply to the random access preamble, using the second RA-RNTI.

4. A control method executed by a base station apparatus, comprising: establishing a connection with a terminal apparatus via a two-step random access procedure by receiving a first signal including a random access preamble and predetermined information from the terminal apparatus and transmitting a second signal as a reply to the first signal to the terminal apparatus or via a four-step random access procedure; and
when establishing the connection via the two-step random access procedure,
acquiring a random access-radio network temporary identifier (RA-RNTI) by adding a predetermined offset value to a value acquired on the basis of a radio resource having been used to transmit the random access preamble with the first signal, and
executing transmission processing of the second signal using the RA-RNTI, and
when establishing the connection via the four-step random access procedure,
acquiring a second RA-RNTI on the basis of a radio resource having been used to transmit a random access preamble from the terminal apparatus to the base station apparatus via the four-step random access procedure, and
executing transmission processing of a random access response, which is a reply to the random access preamble, using the second RA-RNTI.

5. A non-transitory computer-readable storage medium that stores a program for causing a computer provided in a terminal apparatus to:
establish a connection with a base station apparatus via a two-step random access procedure by transmitting a first signal including a random access preamble and predetermined information to the base station apparatus and receiving a second signal as a reply to the first signal from the base station apparatus or via a four-step random access procedure; and
when establishing the connection via the two-step random access procedure,
acquire a random access-radio network temporary identifier (RA-RNTI) by adding a predetermined offset value to a value acquired on the basis of a radio resource having been used to transmit the random access preamble with the first signal, and
execute reception processing of the second signal using the RA-RNTI, and
when establishing the connection via the four-step random access procedure
acquire a second RA-RNTI on the basis of a radio resource having been used to transmit a random access preamble from the terminal apparatus to the base station apparatus via the four-step random access procedure, and
execute reception processing of a random access response, which is a reply to the random access preamble, using the second RA-RNTI.

6. A non-transitory computer-readable storage medium that stores a program for causing a computer provided in a base station apparatus to:
establish a connection with a terminal apparatus via a two-step random access procedure by receiving a first signal including a random access preamble and predetermined information from the terminal apparatus and transmitting a second signal as a reply to the first signal to the terminal apparatus or via a four-step random access procedure; and
when establishing the connection via the two-step random access procedure,
acquire a random access-radio network temporary identifier (RA-RNTI) by adding a predetermined offset value to a value acquired on the basis of a radio resource having been used to transmit the random access preamble with the first signal, and
execute transmission processing of the second signal using the RA- RNTI, and
when establishing the connection via the four-step random access procedure,
acquire a second RA-RNTI on the basis of a radio resource having been used to transmit a random access preamble from the terminal apparatus to the base station apparatus via the four-step random access procedure, and
execute transmission processing of a random access response, which is a reply to the random access preamble, using the second RA-RNTI.

* * * * *